United States Patent [19]

Radtke

[11] 4,321,390
[45] Mar. 23, 1982

[54] PREPARATION OF INSOLUBLE METAL COMPLEX COLORANTS

[75] Inventor: Volker Radtke, Hassloch, Fed. Rep. of Germany

[73] Assignee: BASF Aktiengesellschaft, Ludwigshafen, Fed. Rep. of Germany

[21] Appl. No.: 138,286

[22] Filed: Apr. 8, 1980

[30] Foreign Application Priority Data

Apr. 25, 1979 [DE] Fed. Rep. of Germany ....... 2916697

[51] Int. Cl.³ ............................................. C07F 15/04
[52] U.S. Cl. ..................................... 548/109; 548/101
[58] Field of Search ....................... 548/101, 109, 108; 260/326.1

[56] References Cited

U.S. PATENT DOCUMENTS

| 3,919,235 | 11/1975 | Crounse et al. | 548/109 X |
| 3,966,753 | 6/1976 | Crounse . | |
| 4,065,462 | 12/1977 | Frey . | |
| 4,122,261 | 10/1978 | Crounse et al. | 548/101 X |

FOREIGN PATENT DOCUMENTS

| 18589 | 11/1980 | European Pat. Off. ........... 548/109 |
| 2357830 | 6/1974 | Fed. Rep. of Germany . |

Primary Examiner—Donald G. Daus
Assistant Examiner—Diana G. Rivers
Attorney, Agent, or Firm—Oblon, Fisher, Spivak, McClelland & Maier

[57] ABSTRACT

A process for the preparation of insoluble metal complex colorants of the formula

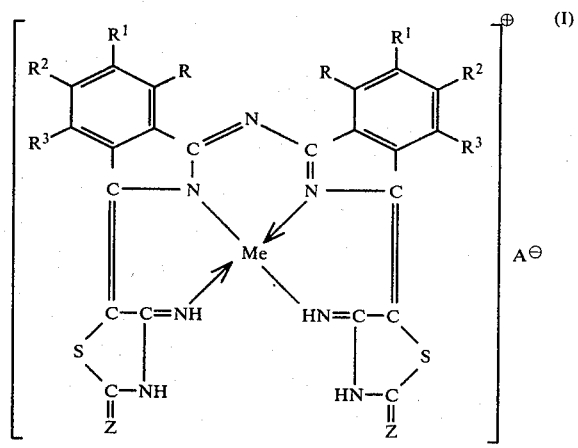

where
R, $R^1$, $R^2$ and $R^3$ may be identical or different and each is hydrogen, $C_1$-$C_4$-alkyl, $C_1$-$C_4$-alkoxy, chlorine, bromine, trifluoromethyl or phenyl,
Me is copper, cobalt or preferably nickel,
Z is NH, O or S and
A is one equivalent of an anion, by condensing the corresponding 1,3-diiminoisoindoline and thiazolidine derivative in the molar ratio of 1:1 in water, isolating the 1:1 condensation product, reacting the latter with a metal salt $MeA_2$ in an aprotic polar water-miscible solvent and isolating the reaction product. The water-containing press cake of the 1:1 condensation product can be used for the reaction with the metal salt $MeA_2$, in which case the water, together with a part of the solvent, is distilled off during the reaction in which (I) is formed.

The process has great economic advantages over the prior art processes.

6 Claims, No Drawings

PREPARATION OF INSOLUBLE METAL COMPLEX COLORANTS

The present invention relates to a process for the preparation of insoluble metal complex colorants.

German Laid-Open Application DOS No. 2,357,830 describes metal complex colorants of the general formula

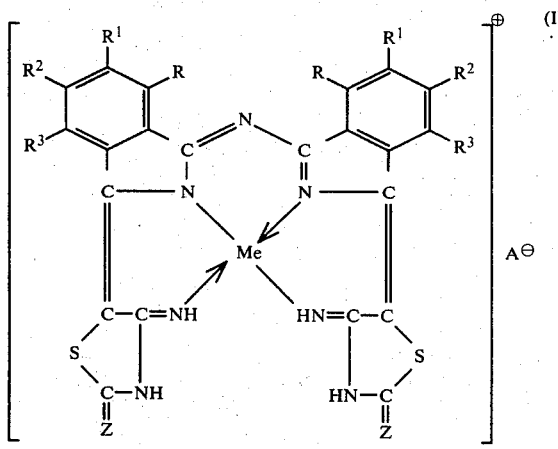

where

R, $R^1$, $R^2$ and $R^3$ may be identical or different and each is hydrogen, $C_1$-$C_4$-alkyl, $C_1$-$C_4$-alkoxy, chlorine, bromine, trifluoromethyl or phenyl, Me is copper, cobalt or preferably nickel, Z is NH, O or S and $A^\ominus$ is one equivalent of an anion, and their preparation.

Amongst the colorants of the formula (I), those where R, $R^1$, $R^2$ and $R^3$ are hydrogen are preferred. Particularly preferred colorants (I) are those where R, $R^1$, $R^2$ and $R^3$ are hydrogen, Me is nickel and Z is >NH or >O, and amongst these, the colorants where Z is >NH are very particularly preferred.

Suitable anions $A^\ominus$ are, in particular, monovalent colorless inorganic and organic anions. Since the anion $A^\ominus$ has no influence on the properties of the metal complex, its choice is substantially optional. As a rule $A^\ominus$ is the same anion as was present in the nickel salt, cobalt salt or copper salt used to prepare the metal complex. Specific examples of $A^\ominus$ are bromide, chloride, iodide, nitrate, acetate, benzenesulfonate and p-toluenesulfonate. Amongst these, bromide and chloride are preferred, since the corresponding metal salts are easily obtainable in a pure form and at low cost.

In general, a metal complex of the formula (I) is obtained by reaction of about 2 mole equivalents of a suitable 1-imino-3-(4'-imino-5'-thiazolidinylidene)-isoindoline of the formula (II) with 1 mole equivalent of a metal salt $MeA_2$, where Z, Me and A have the above meanings:

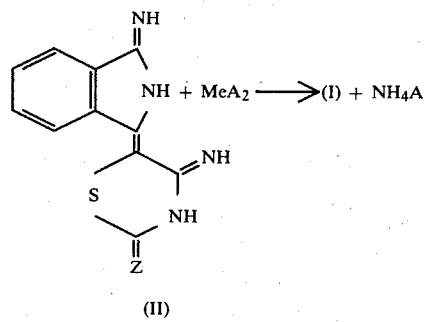

The reaction may be carried out in a strongly polar aprotic solvent, eg. dimethylformamide, dimethylsulfoxide, N-methylpyrrolidone or hexamethylphosphorotriamide, or in a protic solvent such as water or a lower aliphatic alcohol, eg. methanol, ethanol, isopropanol or glycol ethers, such as 2-ethoxyethanol.

The 1-imino-3-(4'-imino-5'-thiazolidinylidene)-isoindolines of the formula (II) are obtained in a conventional manner by reacting 1,3-diimino-isoindoline in a 1:1 molar ratio with a 4-iminothiazolidine derivative

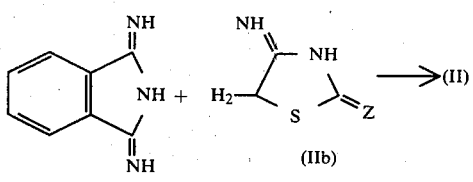

Z having the above meanings (German Laid-Open Application DOS No. 2,357,830, page 17, paragraph 2).

Example 2 of German Laid-Open Application DOS No. 2,357,830 describes a one-vessel process for the preparation of a colorant of the formula (I), where $R=R^1=R^2=R^3=H$, Z=NH, Me=Ni and $A=Cl^\ominus$, wherein 1,3-diiminoisoindoline, nickel chloride and 2,4-diiminothiazolidine benzenesulfonate are reacted with one another in dimethylformamide without isolating the intermediates. The colorants obtained by this process are of very poor crystallinity and are impure. Since the occluded and adhering impurities cannot be washed out even with large amounts of solvents, the products prepared in this way are unsuitable for pigmenting surface coatings and plastics.

German Laid-Open Application DOS No. 2,357,830 also describes a second process for the preparation of (I), wherein a suitable compound of the formula II is first reacted with a zinc halide in a strongly polar aprotic solvent, eg. dimethylformamide, to give a zinc halide adduct III, and the latter is isolated and then reacted, in a further step, with a metal salt $MeA_2$ in a strongly polar aprotic solvent, eg. dimethylformamide, dimethylsulfoxide or hexamethylphosphorotriamide, to give a compound of the formula I

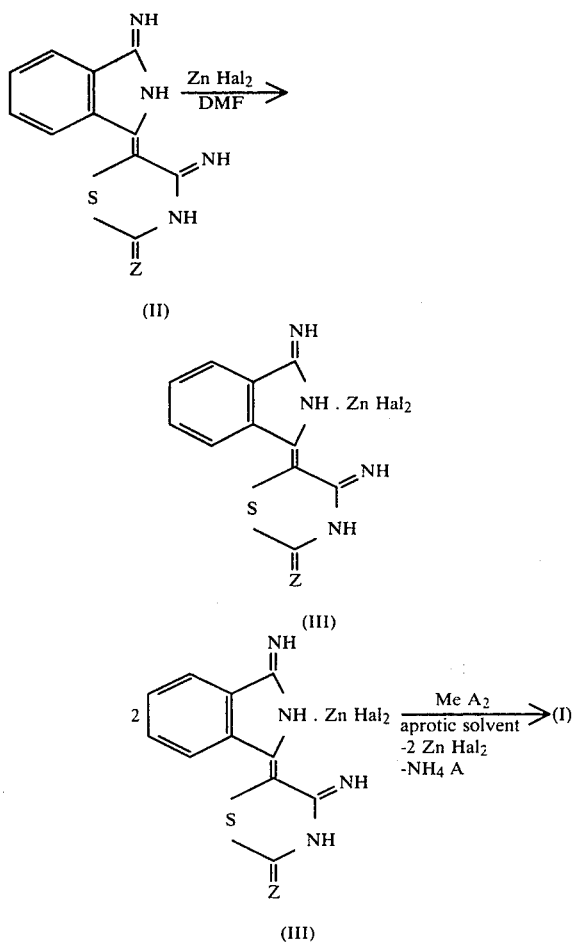

The colorants prepared by this process possess good crystallinity, are analytically pure and can be used, without additional purification and conditioning treatments, for pigmenting surface coatings and plastics. Since, however, their preparation requires large amounts of expensive solvents and the latter must, for ecological and economic reasons, be recovered, it is virtually impossible to prepare the colorants of the formula I at economically acceptable cost.

It is an object of the present invention to provide a process by which a compound of the formula (I) can be prepared reliably, in a pigmentary form, by a less involved and cheaper method.

We have found that this object is achieved and that pure and tinctorially valuable colorants of the formula (I), where R, R¹, R², R³, Me, Z and A have the above meanings, are obtained by condensing a corresponding 1,3-diiminoisoindoline and thiazolidine derivative in a protic solvent and treating the product with a metal salt MeA₂ in a solvent, if the condensation of the diiminoisoindoline (IIa) with a salt of the thiazolidine (IIb) is carried out in water, in the presence or absence of a basic compound, the 1:1 condensation product of the formula (II) is isolated and treated with a metal salt MeA₂ in an aprotic polar water-miscible solvent and the reaction product is isolated.

Accordingly, in the process of the present invention, the formation and intermediate isolation of the zinc halide adduct (III) is dispensed with, and the 1:1 condensation product of the formula (II) is reacted directly with a metal halide MeA₂ in an aprotic solvent. The tinctorial properties of the colorants of the formula (I) prepared by this two-stage process are virtually the same as those of the pigments obtained by a three-stage process via the adduct (III). The formation and isolation of the adduct (III) ultimately only amounts to a purification of the 1-imino-3-(4'-imino-5'-thiazolidinylidene)-isoindoline of the formula (II), since the metal complexes of the formula (I) are also formed from the isoindolines (II) and metal salts MeA₂ in the absence of zinc halides. The compounds of the formula (III) are prepared, according to German Laid-Open Application DOS No. 2,357,830, in an aprotic solvent, eg. dimethylformamide, and the solvent employed must be recovered. Hence, the novel process, which dispenses with the stage of the adduct (III), offers a substantial economic and ecological advantage.

The novel process is carried out by, in the first stage, reacting a suitable 1,3-diiminoisoindoline with an appropriate 4-iminothiazolidine in about equimolar amounts. The thiazolidine derivative is in general employed in the form of a salt, for example the hydrochloride or the benzenesulfonate, since the free bases are not stable. From this salt, the free thiazolidine can be prepared in situ—before addition of the diiminoisoindoline—by using a stoichiometric amount of an auxiliary base, such as dilute ammonia solution, sodium bicarbonate, sodium carbonate or dilute sodium hydroxide solution; however, the condensation takes place even without addition of the auxiliary base, since the reaction itself takes place with elimination of 1 mole of ammonia. In addition to aliphatic alcohols of 1 to 4 carbon atoms, and water, aprotic solvents, eg. dimethylformamide and N-methylpyrrolidone, may also be used; however, the use of water as the solvent is preferred. In general, the reaction is carried out at from 0° to 100° C., preferably from 20° to 80° C.

The conversion of the resulting 1:1 condensation product (II) to the colorant (I) is advantageously carried out in an aprotic solvent, eg. dimethylformamide, N-methylpyrrolidone, dimethylsulfoxide, hexamethylphosphorotriamide or dimethylacetamide. Since these solvents are water-miscible, the condensation products (II) may be employed not only in a dried anhydrous form, but also as an aqueous press cake. In that case it may be advantageous if, during formation of the colorant, the water introduced with the press cake is distilled off together with a part of the chosen solvent.

In general, the reaction of (II) with a metal salt MeA₂ is carried out at from 15° to 100° C., advantageously from 15° to 80° C. Where the water-containing press cake of (II) is used, the reaction is initially carried out at from 15° to 80° C. and the suspension is then heated at from 100° to 150° C., preferably from 105° to 130° C., whereupon the water introduced with the press cake distils off together with a part of the solvent.

In the Examples which follow, parts and percentages are by weight, unless stated otherwise.

EXAMPLE 1

A solution of 103.5 parts of the adduct of 1,3-diiminoisoindoline and ethylene glycol in 600 parts of methanol is added to a solution of 76 parts of 2,4-diiminothiazolidine hydrochloride in 3,000 parts of water. The mixture is stirred for 14 hours at 20°–25° C. under a slight stream of nitrogen and the product is then filtered off and washed with warm water. The 1-imino- 3-(2',4'-diimino-5-'-thiazolidinylidene)-isoindoline (formula II, Z=>NH) is obtained as a press cake of about 20% strength and is employed, in this form, for the subsequent reactions.

EXAMPLE 2

7.6 parts of 2,4-diiminothiazolidine hydrochloride and 10.5 parts of the adduct of 1,3-diiminoisoindoline and ethylene glycol are dissolved in 100 parts of dimethylformamide at room temperature. After a short time, a yellow solid starts to precipitate from the clear solution; at the same time, ammonia is evolved. After 2 hours, the product is filtered off, washed with dimethylformamide and methanol and dried. The yield of 1-imino-3-(2',4'-diimino-5'-thiazolidinylidene)isoindoline (formula II, Z=>NH) is 8 parts.

EXAMPLE 3

75 parts of 2,4-diiminothiazolidine hydrochloride are dissolved in 2,000 parts of water. 105 parts of the solid adduct of 1,3-diiminoisoindoline and ethylene glycol are introduced and the mixture is stirred overnight at room temperature. The product is filtered off, thoroughly washed with water and dried. The yield of 1-imino-3-(2',4'-diimino-5'-thiazolidinylidene)-isoindoline (formula II, Z=>NH) is 100 parts.

EXAMPLE 4

271 parts of 2,4-diiminothiazolidine benzenesulfonate are introduced into a mixture of 3,000 parts of water and 70 parts of concentrated ammonia solution under a slight stream of nitrogen. A solution of 145 parts, of 1,3-diiminoisoindoline in 650 parts of methanol is then run in, stirring is continued for 14 hours at room temperature and the product is filtered off, washed neutral and dried. The yield of 1-imino-3-(2',4'-diimino-5'-thiazolidinylidene)-isoindoline is 230 parts.

EXAMPLE 5

12.2 parts of 1-imino-3-(2',4'-diimino-5'-thiazolidinylidene)-isoindoline, in the form of an aqueous press cake of about 20% strength, prepared as described in Example 1, are stirred with 500 parts of dimethylformamide and 65 parts of nickel chloride NiCl$_2$.6H$_2$O for 14 hours at room temperature. The red suspension is then heated to 110°–120° C., whereupon the water introduced distils off together with dimethylformamide. The above temperature is maintained for 3 hours and the solid is then filtered off whilst the reaction mixture is still warm, and is washed with dimethylformamide and methanol and dried. 13 parts of a deep bluish red pigment of the formula I, where R=R$^1$=R$^2$=R$^3$=H, Z=NH, Me=Ni and A$^\ominus$=Cl$^\ominus$, are obtained.

EXAMPLE 6

49 parts of dry, finely milled 1-imino-3-(2',4'-diimino-5'-thiazolidinylidene)-isoindoline, prepared as described in Example 4, and 24 parts of nickel chloride hexahydrate in 1,000 parts of dimethylformamide are stirred for 14 hours at 20°–25° C. The mixture is then heated to 110°–115° C., this temperature is maintained for 3 hours, and the product is filtered off and washed with dimethylformamide and methanol until the washings are colorless. After drying and milling, 52 parts of a soft-textured deeply colored solid of the formula (I), where R=R$^1$=R$^2$=R$^3$=H, Z=NH, Me=Ni and A$^\ominus$=Cl$^\ominus$, are obtained; in a surface coating, this product has a somewhat more bluish hue than the pigment obtained as described in Example 5.

EXAMPLE 7

If the procedure described in Example 5 is followed, but 500 parts of N-methylpyrrolidone are used as the solvent in place of dimethylformamide, a colorant with similar properties is obtained.

EXAMPLE 8

If the procedure described in Example 6 is followed, but 600 parts of dimethylacetamide are used as the solvent, 12 parts of a deeply colored red pigment are isolated; its tinctorial properties substantially match those of the product of Example 6.

EXAMPLE 9

The procedure described in Example 5 is followed, but 600 parts of dimethylsulfoxide are employed as the solvent. The tinctorial properties of the pigment obtained correspond to those of the pigment of Example 5.

EXAMPLE 10

The procedure described in Example 6 is followed, but instead of dimethylformamide 500 parts of hexamethylphosphorotriamide are employed as the solvent. The resulting pigment of the formula (I) (R=R$^1$=R$^2$=R$^3$=H, Me=Ni, Z=NH, A$^\ominus$=Cl$^\ominus$) is somewhat more bluish and of slightly lower tinctorial strength than the product obtained in dimethylformamide.

EXAMPLE 11

17.5 parts of 2-oxo-4-iminothiazolidine and 32 parts of the adduct of 1,3-diiminoisoindoline and ethylene glycol, in 400 parts of methanol, are refluxed for 5 hours. After the mixture has cooled, the product is filtered off, washed with methanol and dried. 33 parts of 1-imino-3-(2'-oxo-4'-iminothiazolidinylidene)-isoindoline (formula II, Z=°O) are obtained as a yellowish brown powder.

EXAMPLE 12

11.4 parts of 2-oxo-4-iminothiazolidine are stirred with 15 parts of 1,3-diiminoisoindoline in 300 parts of water for 40 hours at about 25° C., whilst passing a slight stream of nitrogen over the mixture. The product is then filtered off and washed with water, giving 22 parts of 1-imino-3-(2'-oxo-4'-iminothiazolidinylidene)-isoindoline (Formula II, Z=>O), the spectroscopic properties of which correspond to those of the product obtained as described in Example 11.

EXAMPLE 13

12.2 parts of 1-imino-3-(2'-oxo-4'-imino-thiazolidinylidene)-isoindoline, prepared as described in Example 12, and 6.5 parts of nickel chloride hexahydrate, in 500 parts of dimethylformamide, are stirred for 3 hours at room temperature. The mixture is then heated to 100° C. in stages over 3 hours, kept at this temperature for one hour and filtered. After washing the product with dimethylformamide and methanol, 7 parts of a deeply colored, strongly bluish red colorant of the formula (I), where R=R$^1$=R$^2$=R$^3$=H, Me=Ni, Z=O and A$^\ominus$=Cl$^\ominus$, are obtained.

EXAMPLE 14

12.2 parts of 1-imino-3-(2',4'-diiamino-5'-thiazolidinylidene)-isoindoline in the form of an aqueous press cake of about 20% strength, in 500 parts of dimethylformamide, are stirred with 7.5 parts of nickel nitrate Ni(NO$_3$)$_2$.6H$_2$O for 14 hours at room temperature.

The mixture is then heated to 120° C. over 2 hours, during which the water introduced distils off with a part of the solvent. After keeping the mixture at 120°–125° C. for 3 hours, the product is filtered off and washed with dimethylformamide and then with methanol until the washings are colorless. After drying and milling, 13 parts of a deeply colored red pigment of the formula (I), where R=R$^1$=R$^2$=R$^3$=H, Me=Ni, Z=NH and A$^\ominus$=NO$_3{}^\ominus$, are obtained; used in a surface coating, it gives a somewhat more yellowish color than the product obtained as described in Example 5.

EXAMPLE 15

The procedure described in Example 14 is followed, but 7.5 parts of nickel sulfate NiSO$_4$.3H$_2$O are employed, in place of the nitrate, as the metal salt. The resulting pigment of the formula (I), where R=R$^1$=R$^2$=R$^3$=H, Me=Ni, Z=NH and A$^\ominus$=½ SO$_4{}^{2-}$, has tinctorial properties corresponding to those of the product of Example 14.

EXAMPLE 16

The procedure of Example 14 is followed except that the equimolar amount of nickel acetate Ni(OAc)$_2$.4H$_2$O is employed as the nickel salt. 11 parts of a colorant of the formula (I), where R=R$^1$=R$^2$=R$^3$=H, Me=Ni, Z=NH and A$^\ominus$=CH$_3$CO$_2{}^\ominus$ are obtained; in a surface coating, this gives particularly bluish red colorations.

EXAMPLE 17

The procedure described in Example 6 is followed, but 22 parts of anhydrous nickel bromide NiBr$_2$ are employed in place of the chloride. A colorant of the formula (I) where R=R$^1$=R$^2$=R$^3$=H, Z=NH, Me=Ni and A$^\ominus$=Br$^\ominus$ is obtained in a yield of 54 parts; its tinctorial properties correspond almost exactly to those of the pigment from Example 6.

EXAMPLE 18

The procedure described in Example 5 is followed, but anhydrous nickel thiocyanate Ni(SCN)$_2$ is employed as the metal salt. A brilliant, bluish red colorant of the formula (I), where R=R$^1$=R$^2$=R$^3$=H, Me=Ni, Z=NH and A$^\ominus$=SCN$^\ominus$ is obtained in good yield.

EXAMPLE 19

12.2 parts of anhydrous finely milled 1-imino-3-(2′,4′-diimino-5′-thiazolidinylidene)-isoindoline, prepared as described in Example 3, are stirred for 4 hours with 4.5 parts of copper chloride CuCl$_2$.2H$_2$O in 100 parts of dimethylformamide at 100° C. The mixture is then allowed to cool and the product is filtered off, washed with dimethylformamide and then with methanol, and dried. 12 parts of a strongly bluish red colorant of the formula (I), where R=R$^1$=R$^2$=R$^3$=H, Me=Cu, Z=NH and A$^\ominus$=Cl$^\ominus$, are obtained.

EXAMPLE 20

If the copper chloride of Example 19 is replaced by an equimolar of copper acetate Cu(O$_2$CCH$_3$)$_2$.H$_2$O and in other respects the procedure described in Example 19 is followed, a bluish red colorant of the formula (I), where R=R$^1$=R$^2$=R$^3$=H, Me=Cu, Z=NH and A$^\ominus$=CH$_3$CO$_2{}^\ominus$, is obtained in the same yield.

EXAMPLE 21

If the copper chloride used in Example 19 is replaced by an equimolar amount of copper sulfate CuSO$_4$.5H$_2$O and in other respects the procedure described in Example 19 is followed, 12 parts of a reddish brown colorant of the formula (I), where R=R$^1$=R$^2$=R$^3$=H, Me=Cu, Z=NH and A$^\ominus$=½ SO$_4$, are obtained.

EXAMPLE 22

The procedure described in Example 19 is followed, except that 3 parts of cobalt chloride CoCl$_2$.6H$_2$O are employed as the metal salt. 12 parts of a brown colorant of the formula (I), where R=R$^1$=R$^2$=R$^3$=H, Me=Co, Z=NH and A$^\ominus$=Cl$^\ominus$, are obtained.

We claim:

1. A process for the preparation of an insoluble metal complex colorant of the formula:

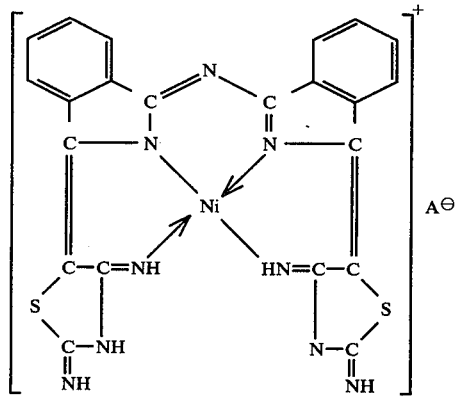

wherein A is one equivalent of an anion selected from the group consisting of bromide, chloride, iodide, nitrate, acetate, benzenesulfonate and p-toluenesulfonate, comprising:

(a) condensing a 1,3-diiminoisoindoline of the formula:

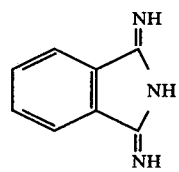

with a thiazolidine of the formula:

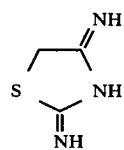

in a 1:1 molar ratio in water;
(b) isolating the condensation product;
(c) reacting said condensation product in the form of an aqueous press cake with NiA$_2$ in an aprotic, polar, water-miscible solvent selected from the group consisting of dimethylformamide, N-methylpyrrolidone, dimethylsulfoxide, hexamethylphosphorotriamide and dimethylacetamide; and (d) obtaining said insoluble metal complex colorant.

2. The process of claim 1, wherein during the reaction of said condensation product with NiA$_2$, the water in the press cake is removed by distillation together with a portion of the aprotic polar solvent.

3. The process of claim 1 or 2, wherein the reaction of said condensation product with NiA$_2$ is conducted at a temperature from 15°–100° C.

4. The process of claim 2, wherein the reaction of said condensation product with NiA$_2$ is first conducted at a temperature from 15°–80° C., and then the suspension of the solid material is heated at a temperature from 100°–150° C.

5. The process of claim 4, wherein said suspension is heated at a temperature from 105°–130° C.

6. The process of claim 1, wherein the condensation reaction of step (a) is conducted in the presence of a base.

* * * * *